(12) United States Patent
Lindvall

(10) Patent No.: US 6,237,536 B1
(45) Date of Patent: May 29, 2001

(54) ANIMAL BOX FOR BREEDING

(76) Inventor: Tommy Ulf Ivan Lindvall, Kvie Ekeby, S-621 70 Visby (SE)

( * ) Notice: Subject to any disclaimer, the term of this patent is extended or adjusted under 35 U.S.C. 154(b) by 0 days.

(21) Appl. No.: 09/331,230

(22) PCT Filed: Dec. 19, 1997

(86) PCT No.: PCT/SE97/02193

§ 371 Date: Jun. 18, 1999

§ 102(e) Date: Jun. 18, 1999

(87) PCT Pub. No.: WO98/27808

PCT Pub. Date: Jul. 2, 1998

(30) Foreign Application Priority Data

Dec. 20, 1996 (SE) .................................................... 9604750

(51) Int. Cl.[7] .................................................. A01K 29/00
(52) U.S. Cl. ............................................................. 119/528
(58) Field of Search ................................. 119/438, 479, 119/528, 164

(56) References Cited

U.S. PATENT DOCUMENTS

| | | | | |
|---|---|---|---|---|
| 2,039,783 | * | 5/1936 | Ebeling | 119/164 |
| 3,871,331 | * | 3/1975 | Breau | 119/164 |
| 4,465,018 | * | 8/1984 | Mopper | 119/164 |
| 4,844,011 | * | 7/1989 | Strickland | 119/164 |
| 5,279,258 | * | 1/1994 | Kakuta | 119/164 |
| 5,289,799 | * | 3/1994 | Wilson | 119/164 |
| 5,592,900 | * | 1/1997 | Kakuta | 119/164 |
| 5,758,600 | * | 6/1998 | Jyh | 119/161 |

FOREIGN PATENT DOCUMENTS

| | | |
|---|---|---|
| WO 9625846 | 8/1996 | (NL) . |
| 697110 | 11/1979 | (SU) . |
| 1230559 | 5/1986 | (SU) . |
| 1774845 | 11/1992 | (SU) . |

OTHER PUBLICATIONS

Derwent's abstract, No. 87–5856/01, week 8701, Abstract of SU, 1230559 (Andrenko V N), May 15, 1986.
Derwent's abstract, No. F8723 C/27, week 8027, Abstract of SU, 697110 (Belo Livestock Res), Nov. 15, 1979.
Derwent's abstract, No. 93–376044/47, week 9347, Abstract of SU, 1774845 (Popov Yu M), Nov. 7, 1992.

* cited by examiner

*Primary Examiner*—Thomas Price
(74) *Attorney, Agent, or Firm*—Banner & Witcoff, Ltd.

(57) ABSTRACT

An animal box for animal breeding including an endless belt that defines a support surface for the animals. The support surface is intermittently movable in the longitudinal direction of the box, while the animals are on the surface. The portion of the surface where the animals mainly dwell successively increases at the inlet end of the box and successively changes into the portion of the surface where the animals mainly leave their dung. The latter portion successively disappears at the outlet end of the box on discharge of the manure. A littering means for delivery of, for instance, straw is provided at the inlet end of the box and a belt cleaner is provided at the outlet end of the box.

14 Claims, 3 Drawing Sheets

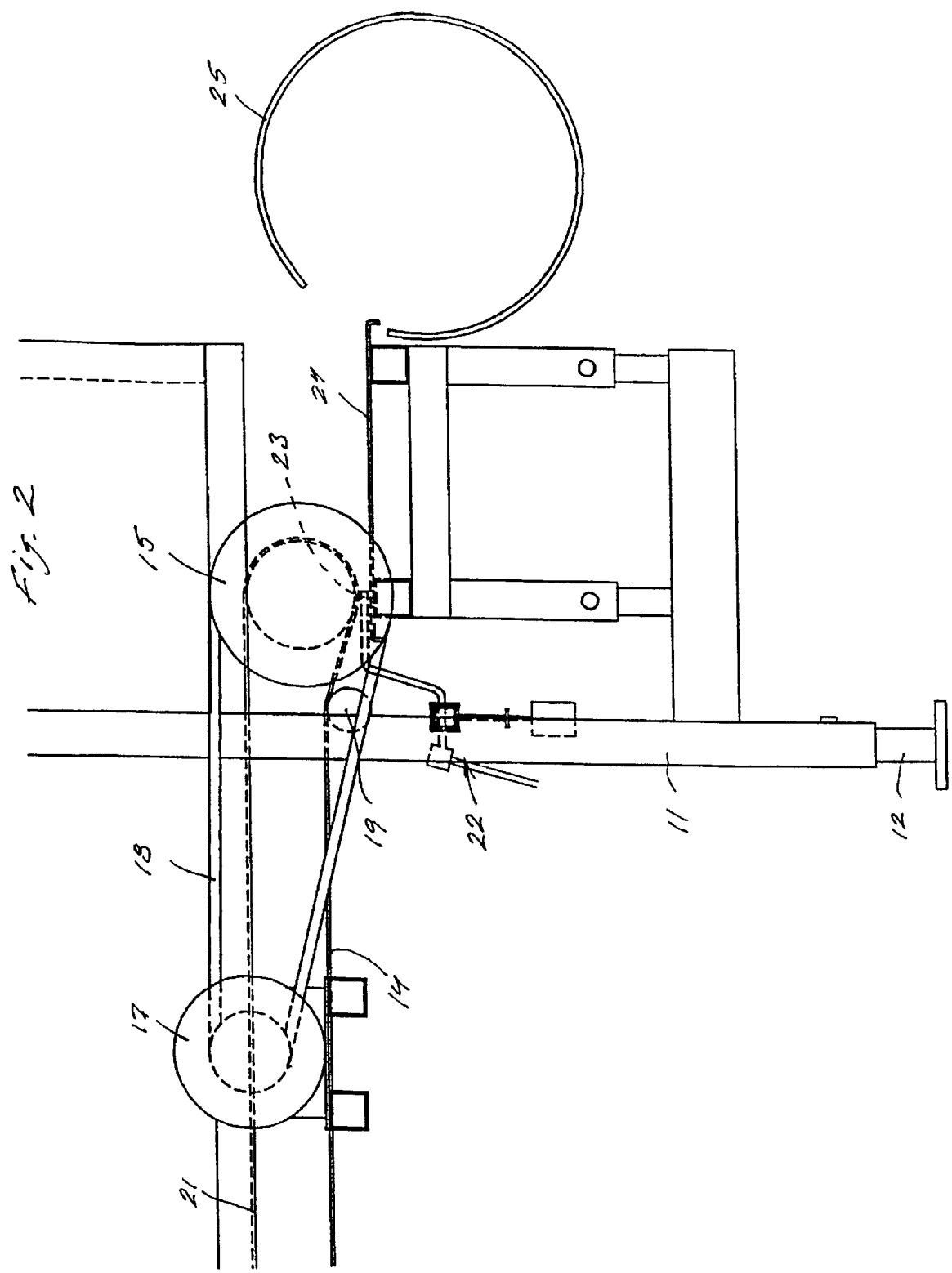

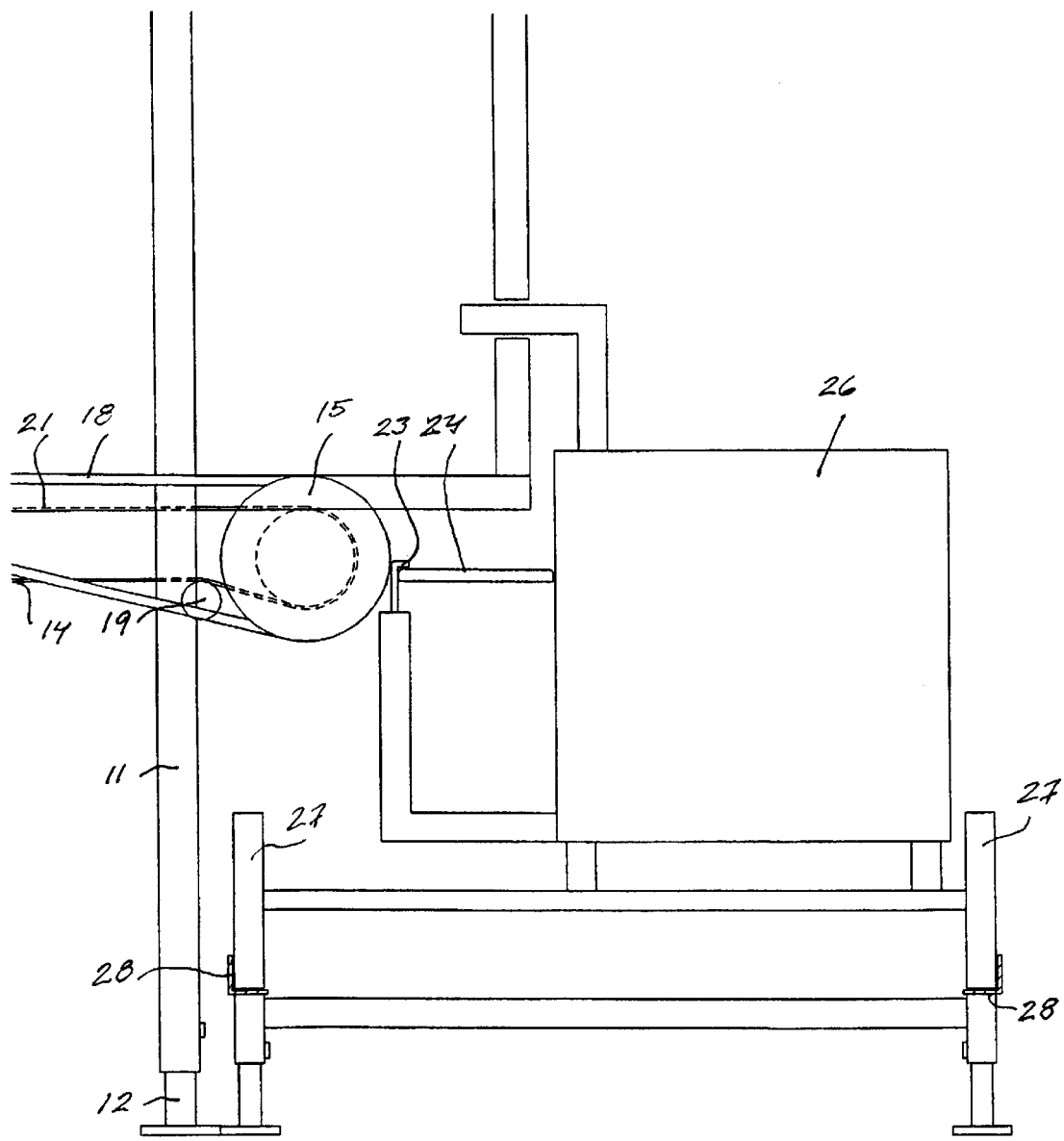

ANIMAL BOX FOR BREEDING

Figure 1:
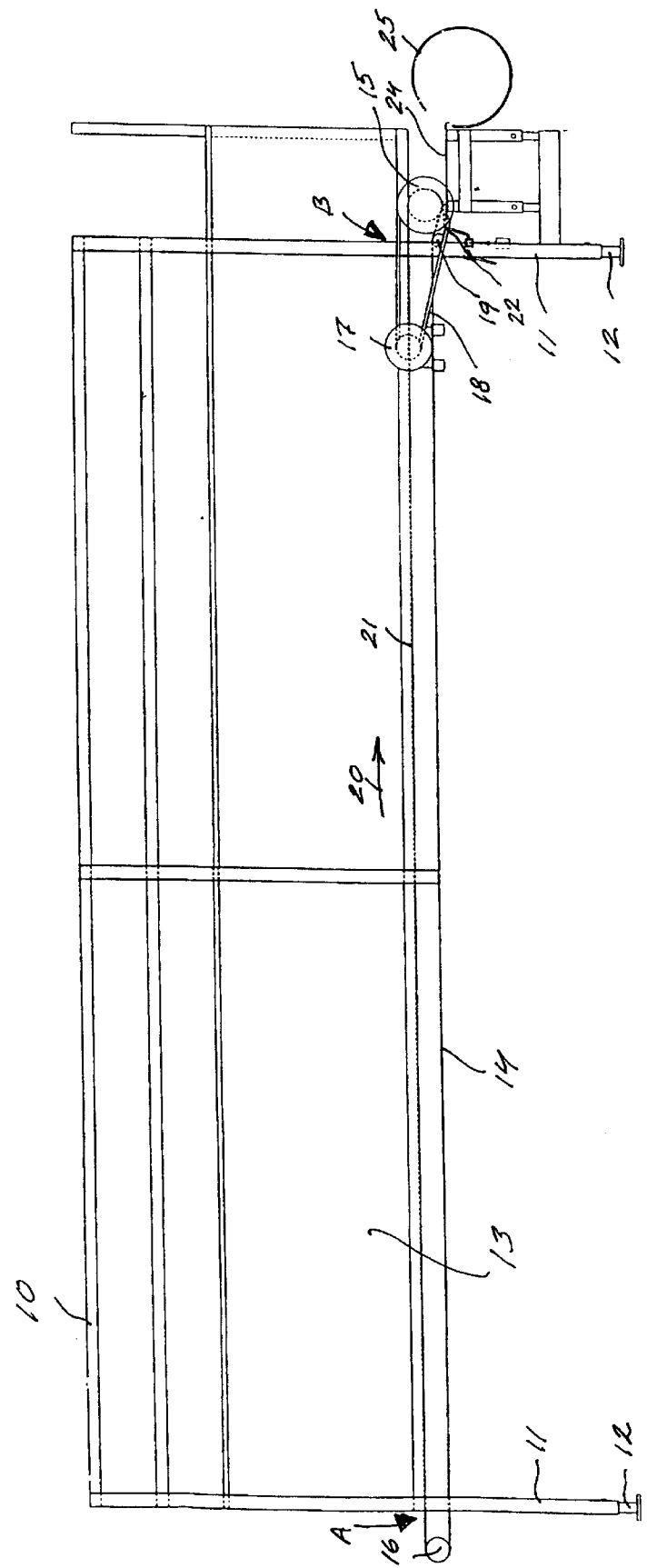

The present invention relates to an animal box for animal breeding. The problem underlying the invention is the poor hygienic conditions associated with conventional animal breeding, in particular pig breeding, with the resulting considerable risk of infection, administration of antibiotics, poor working environment and low animal growth. Another problem today is the difficulty in moving the dung to grounds which are not already overfertilized.

The above problem is mainly due to the fact that the dung cannot be removed and utilized in a satisfactory manner and that the animals cannot stay in the same box from birth until they are a suitable size for disposal, but have to be moved between different boxes mixing with different litters with the resulting risks of infection.

In SU-A 1 230 559 an animal box is described with a conveyor belt carrying the animals. During the cleaning the belt is moved in one direction out from the box while the animals are removed from the box. Since the belt after cleaning and strawing has been brought back in the opposite direction the animals are returned to the box. However, this box, which from a superficial point of view reminds of the present invention, does not solve the above stated problem. Even if it may be considered to facilitate the cleaning a little it requires that the box is removed at each cleaning.

These and related problems are solved by the animal box of the invention having been given the features stated in the characterizing portion of claim 1. Further improvements and modifications are stated in the dependent claims.

An embodiment of the invention will now be described with reference to the appended drawings, wherein FIG. 1 is a diagrammatic side view showing an animal box according to the invention, FIG. 2 is a view of one end of the animal box on an enlarged scale, and FIG. 3 is a view of the same end, however, with a modified manure discharge device.

FIG. 1 is a side view of an animal box according to the invention, in this case a pig box. It is comprised of a frame 10 with legs 11, which are provided with adjustable feet 12, the box having side walls 13 of, for example, water-resistant plywood. The entire floor of the box, i.e. the surface supporting the animals, is defined by an endless belt 14, passing over a drive roller 15 at one end and a tension roller 16 at the other end. The drive roller 15 is driven by an electric motor 17 via a V-belt 18. A guide roller 19 keeps the belt abutted against the drive roller 15. The belt 14 is intermittently movable in the direction of the arrow 20, while the animals are on the surface of the belt defined by the upper part 21 thereof. Thus, said upper part moves from an inlet end A of the box to an outlet end B of the same. This intermittent movement is, of course, very slow and is simply compensated by the small shifting movements of the animals.

This means that the portion of the surface where the animals mainly dwell successively increases at the inlet end A and successively changes into the portion of the surface where the animals mainly leave their dung. This latter portion successively disappears at the outlet end B of the belt on discharge of the manure.

At the inlet end A there is provided a littering means (not shown) for delivery of, for instance, straw. Said littering means may be comprised of a tube for strawing, which opens above the inlet end A of the belt part 21. Between the opening thereof and the upper surface 21 of the belt there is defined an outlet gap for straw, adapted to the grubbing instinct of the animals.

At the outlet end B there is disposed a belt cleaner 22. Said belt cleaner comprises nozzles 23 for compressed air or water, oriented tangentially relative to the surface of the belt 14 after the belt has been turned round the drive roller 15. The nozzles 23 are movable transversely to the spraying direction over the entire width of the belt 14. Between the sprayed part of the belt 14 and a manure discharge channel 25 there is provided a smooth sliding surface 24. The manure discharge channel is comprised of a tube, wherein a pull wire with scraping tools (not shown) is provided for transferring the dung to a closed storage space. The surplus heat is utilized for heating of the stable, for instance. The manure discharge channel 25, which is thus connected to a closed manure processing system, may also be utilized for ventilation.

A weight cell (not shown) may be disposed between the animal supporting part of the animal box and a fixed underlayer for continuous weighing of the animals for controlling the composition and quantity of the fodder supplied. The control means for the belt drive, belt cleaning, manure discharge, strawing and foddering may be integrated in one and the same computer system. The animal box may be constructed as a movable assembly to be put up and combined with several similar assemblies, which are all connectable to common sources of driving power, fodder etc and to common control units.

The animal box according to the invention is, of course, not limited to the disclosed construction of the belt cleaner. As an alternative, the latter may be comprised of an endless belt, which is intermittently movable in the same direction as the box floor belt 14 and is comprised of carriers taking dung obliquely upwards to the manure discharge channel. An endless belt would also be possible, said belt extending transversely to the box floor belt 14 and terminating on a smooth sliding surface with fixed spray nozzles, which take the dung to the manure discharge channel. Further, the smooth sliding surface 24 may be provided with transverse scrapes, which take the dung to a fixed point, where fixed spray nozzles take the dung to the manure discharge channel. The belt 14 may also be provided with a scraping tool at the end B, with an adjustable door, which provides a variable gap, being complemented by spray nozzles which take the dung to the manure discharge channel.

In FIG. 3 there is shown a modified manure discharge device comprised of a carriage 26, running by wheels 27 on rails 28, which extend along the ends B of a plurality of animal boxes and to and from an emptying station (not shown). Here, the belt cleaner 22 with the spray nozzles 23 for compressed air or water is supported by the carriage 26, the smooth sliding surface 23 remaining on the animal boxes. The travel of the carriage 26 is computer controlled in cooperation with the travel of the belt 14. Thereby the intermittent movement of the belt takes place, when the carriage is at the animal box in question, and the discharge of the manure can take place.

The animal box according to the invention solves the initially mentioned problems and enables the animals to remain in the same animal box from birth, until the breeder disposes of the animals. This means that high demands as to hygiene are fulfilled and that the animals need not be given any antibiotics. In addition, it implies a good working environment and low utilization of labour as a result of advanced automatics as regards foddering, manure discharge, strawing, weight control and decontamination. Computer controlled foddering coupled with continuous follow-up of growth per box is enabled, which promptly provides information on growth disturbances, if any. The computer system may also comprise climate control. The continuous removal of dung means reduced problems with ammonia. Since the belt provides a more animal-friendly floor surface than concrete, articular problems of the animals will diminish. All this means increased animal growth and a higher market value owing to anticipated better animal health and breeding without using antibiotics.

The animal boxes may be delivered as complete assemblies and owing to their flexibility can be put up at least provisionally in existing buildings for possible later transfer to a new production place. The invention solves, to a great extent, the great problems currently encountered as a result of the difficulty in moving dung to grounds which are not overfertilized. A 70% reduction of the manure volume may be expected. Thus, the invention also means that it will be easier to move manure, bringing considerable environmental gains.

What is claimed is:

1. An animal box for animal breeding comprises an inlet end, an outlet end, an animal support surface for supporting an animal in the box, said entire animal support surface is defined by an endless belt intermittently movable in a longitudinal direction of the box, littering means provided at the inlet end of the box, a belt cleaner provided at the outlet end of the box and sidewalls that keep the animal constantly in the box, and wherein when the animal is on said support surface, a portion of the support surface where the animal mainly dwells successively increases at the inlet end of the box and successively changes into a portion of the surface where the animal mainly leaves its dung, the dung leaving portion successively disappears at the outlet end of the box as the dung is discharged.

2. An animal box according to claim 1, wherein the belt cleaner comprises spray nozzles for compressed air or water, said spray nozzles are oriented tangentially relative to the surface of the belt after the belt has been turned round end rollers, a smooth sliding surface provided between the sprayed part of the belt and a manure discharge device.

3. An animal box according to claim 2, wherein the spray nozzles are movable transversely to the spraying direction over the entire width of the belt.

4. An animal box according to claim 3, wherein the manure discharge device comprises a channel connected to a closed manure processing system.

5. An animal box according to claim 3, wherein the manure discharge device comprises a carriage, which is movable between several animal boxes as well as to and form an emptying station, and travel of said carriage is computer controlled in cooperation with the travel of the belt.

6. An animal box according to claim 2 wherein the manure discharge device comprises a channel connected to a closed manure processing system.

7. An animal box according to claim 6, wherein the manure discharge channel is comprised of a tube, said tube is provided with a pull wire with scraping tools for transfer of the dung to a closed storage space.

8. An animal box according to claim 2, wherein the manure discharge device comprises a carriage, which is movable between several animal boxes as well as to and from an emptying station, and travel of said carriage is computer controlled in cooperation with the travel of the belt.

9. An animal box according to claim 8, wherein the spray nozzles are disposed on the carriage.

10. An animal box according to claim 1, wherein the littering means is comprised of a tube for strawing which opens just above the inlet end of the box, and wherein between an opening of the strawing tube and the upper surface of the belt there is an outlet gap for straw, adapted to the grubbing instinct of the animal.

11. An animal box according to claim 1, wherein the littering means is movable above the sidewalls of the animal box and is provided with a screw feeder, and the littering is computer controlled.

12. An animal box according to claim 1, further including at least one weight cell disposed between the animal supporting part of the animal box and a fixed underlayer for continuous weighing of the animal for controlling the composition and quantity of the fodder supplied.

13. An animal box according to claim 12, wherein controls for belt drive, belt cleaning, manure discharge, strawing and foddering are integrated in a computer system.

14. An animal box according to claim 1, wherein the animal box is constructed as a movable assembly that is capable of being put in combination with several similar assemblies, and said animal box is capable of being connected to sources of driving power and control units that can be common to the assemblies.

* * * * *